United States Patent [19]

Edem et al.

[11] Patent Number: 5,361,261
[45] Date of Patent: Nov. 1, 1994

[54] FRAME-BASED TRANSMISSION OF DATA

[75] Inventors: Brian C. Edem, San Jose; Debra J. Worsley, Sunnyvale, both of Calif.

[73] Assignee: National Semiconductor Corporation, Santa Clara, Calif.

[21] Appl. No.: 970,329

[22] Filed: Nov. 2, 1992

[51] Int. Cl.[5] .......................... H03M 7/00; H04J 3/02
[52] U.S. Cl. .................................. 370/85.3; 370/94.1; 370/97; 370/110.1; 370/112; 341/102
[58] Field of Search ...................... 370/60, 79, 80, 82, 370/84, 85.1, 85.2, 85.3, 85.7, 94.1, 94.2, 110.1, 110.4, 111, 112, 118, 97; 358/11–14, 133, 141, 142, 146; 341/51, 52, 60, 67, 68, 70, 76, 95, 102

[56] References Cited

U.S. PATENT DOCUMENTS

| | | | |
|---|---|---|---|
| 4,220,816 | 9/1980 | Howells et al. | 370/24 |
| 4,258,434 | 3/1981 | Glowinski et al. | 370/60 |
| 4,412,324 | 9/1983 | Glowinsky et al. | 370/58.1 |
| 4,530,088 | 7/1985 | Hamstra et al. | 370/110.1 |
| 4,549,292 | 9/1985 | Isaman et al. | 370/85.15 |
| 4,587,650 | 5/1986 | Bell et al. | 370/85.15 |
| 4,637,014 | 1/1987 | Bell et al. | 370/85.15 |
| 4,782,485 | 11/1988 | Gollub | 370/118 |
| 4,845,609 | 7/1989 | Lighthart et al. | 370/85.1 |
| 4,858,232 | 8/1989 | Diaz et al. | 370/85.7 |
| 4,876,683 | 10/1989 | Suzuki | 370/97 |
| 4,961,188 | 9/1990 | Lau | 370/94.2 |
| 5,001,707 | 3/1991 | Kositpaiboon | 370/94.1 |
| 5,007,045 | 4/1991 | Tsuzuki | 370/94.1 |
| 5,065,398 | 11/1991 | Takashima | 370/94.1 |
| 5,138,440 | 8/1992 | Radice | 370/110.1 |

OTHER PUBLICATIONS

Integrated PBX Systems, An NCC State of the Art Report, The National Computing Centre Limited, 1987.
ISDN Basic Rate Interface System Design Guide, Telenetworks document, Aug. 1989.
ISDN Primary Rate Interface System Design Guide, Telenetworks document, Jul. 1989.
Draft Supplement to IEEE STD 802.3 CSMA/CD Access Method and Physical Layer Specifications, The Institute of Electrical and Electronic Engineers, Inc., (Nov. 15, 1989).
Irube et al., "Integrated Information and Communication System for Business Networks", *Hitachi Review*, 40(3):241–247 (1991).
HMUX ERX "FDDI–II Hybrid Multiplexor" Rev. 2.4, 1991.
IBM Corporation, "Task Order", pp. 6–7, 1992.
DP8390, "Network Interface Controller: An Introduc- (List continued on next page.)

Primary Examiner—Alpus H. Hsu
Attorney, Agent, or Firm—Townsend and Townsend Khourie and Crew

[57] ABSTRACT

A network for transferring packet data in a frame structure, preferably mixed with isochronous data is provided. The frame structure is a continuously repeating structure, with each frame having a number of time slots. Certain ones of the time slots are available for transmitting packet data. The packet data is re-timed, e.g., by using a FIFO to output the data nibble-wise as required by the frame structure. Similar re-timing can be used for isochronous data so that the frame structure defines time-division multiplexing of the packet data and isochronous data. A four/five encoding scheme provides sufficient encoding efficiency that both the packet data and other data can be accommodated without degrading the data rate of the packet data. The encoding scheme provides extra symbols which can be used for transferring "no carrier" information, or "frame alignment" messages. Preferably, the frame structure is translated to and from a packet structure to permit the present invention to be used with previously available packet circuitry such as a media access controller and a hub repeater circuit. Latency of the FIFO can be reduced by pre-filling with packet preambles, and/or sub-latency propagation of preamble bytes, or providing special MACs which do not output preambles, and using the buffer circuitry to output preambles.

23 Claims, 12 Drawing Sheets

OTHER PUBLICATIONS tory Guide", LAN Databook, pp. 206–213, 1992.

DP83932B, "Systems-Oriented Network Interface Controller", LAN Databook, pp. 288–383, 1992.

DP83950A, "Repeater Interface Controller", LAN Databook, pp. 3–75, 1992.

DP83950EP at IEEE 802.3, Multi-Port Repeater Evaluation Kit, LAN Databook, pp. 75–87, 1992.

IEEE 802.9 Draft Standard Integrated Services (IS) LAN Interface at the MAC and PHY Layers, Institute of Electrical and Electronics, Nov. 1992.

"National Proposes Isochoronous Ethernet", *Electronic News*, vol. 38, No. 1940, p. 19, Nov. 1992.

"IBM's Multimedia Venture: Opportunity for its Hardware?", vol. 38, No. 1930, p. 1, Sep. 1992.

C. A. Gallagher, 'IEEE 802.9: A Multi-Service Lan Interface', Second IEEE National Conference on Telecommunications, Apr. 1989, York, GB, pp. 173–178.

P. Martini, et al., Real-Time Traffic in FDDI-II, Packet Switching vs. Circuit Switching, IEEE Infocom 1991, vol. 3, Apr. 1991, Bal Harbour, U.S., pp. 1413–1420.

F. E. Ross, et al., 'FDDI—A Lan Among Mans', Computer Communications Review, vol. 20, No. 3, Jul. 1990, New York, U.S., pp. 16–31.

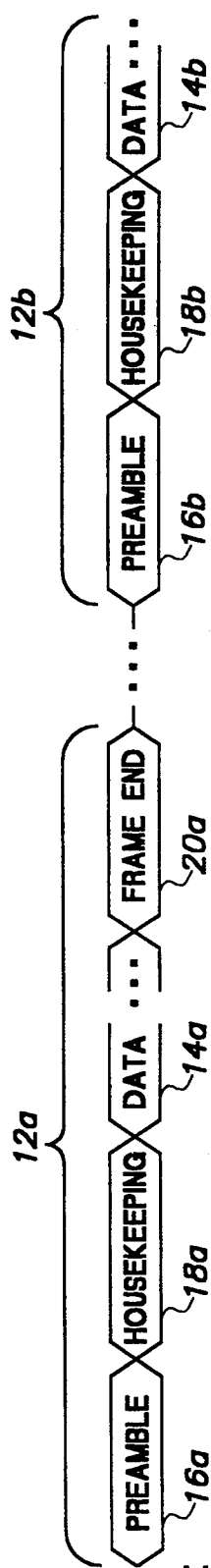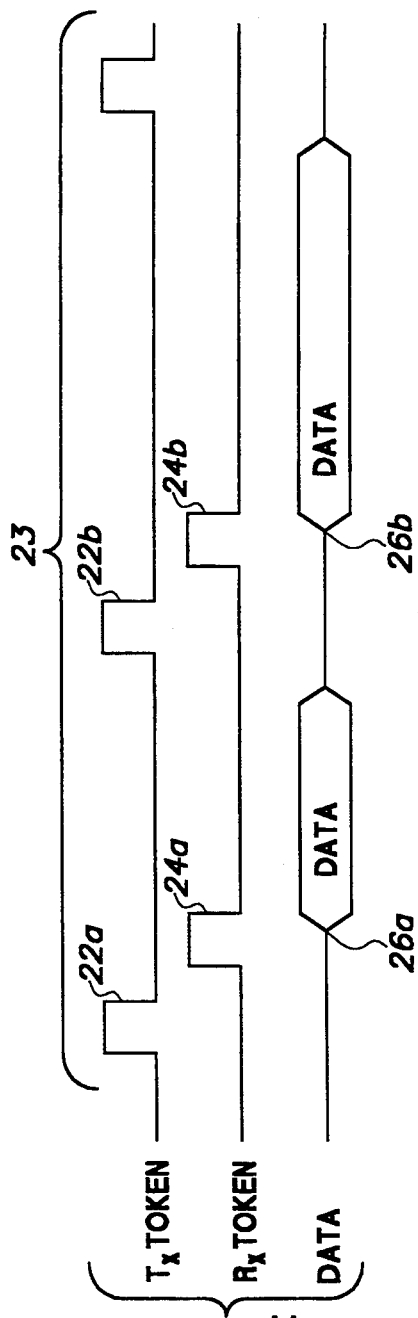

Ethernet Frame Format

IEEE 802.3 Frame Format

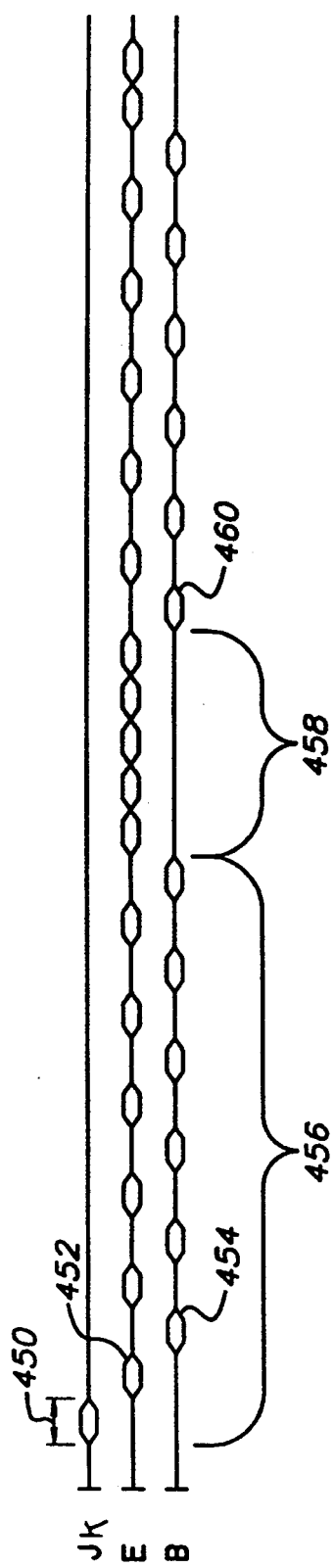

FRAME-BASED TRANSMISSION OF DATA

The present invention relates to a data communication network, such as a local area network or wide area network, and in particular to a network for transferring packet data preferably mixed with isochronous data.

BACKGROUND OF THE INVENTION

The previous networks for communicating packet data, although useful in certain situations, have suffered from certain deficiencies. Among these is the inability to efficiently transmit both the packet data and non-packet data such as isochronous data, over the same physical media. Because isochronous-source data is not packetized, it cannot be accommodated in a packet format without substantially interfering with its isochronous character, often introducing an undesirable amount of delay or jitter.

The relationship between packetized data and isochronous data is best discussed after distinguishing between isochronous-source data and isochronous data transfer. In general terms, isochronous data is data which is non-packetized and of indeterminate, potentially continuous duration. An isochronous data source is a device which outputs data in a continuous stream, usually at a substantially constant average data rate. Examples include video cameras, which output a substantially continuous stream of data representing images and associated sounds, and telephone output, which can be a substantially continuous output of voice data (either analog or digitized). An example of an isochronous data sink is a video monitor which can receive a substantially continuous stream of video data for display.

Related to isochronous sources and sinks is the concept of data transfer which can also be either isochronous or non-isochronous. One type of non-isochronous data transfer is a packet-type transfer. As shown in FIG. 1A, data can be transferred in a plurality of packets 12a, 12b which can be either constant-sized or variable-sized. Each packet includes a field of data 14a, 14b which may be preceded and/or followed by non-data information such as preamble information 16a, 16b housekeeping information such as data source information, data destination information, and the like 18a, 18b, in some packet schemes, a frame end marker 20a is provided. In a typical packet system, there is no signal on the medium during the periods between packet transmissions which are of varying, indeterminant length. As seen in FIG. 1A, because the fields provided for data 14a, 14b are not substantially continuous, the packetized scheme of FIG. 1A is not isochronous but is "bursty" in nature. The timing of packet transmissions is irregular, and generally determined by data needs. An example of packetized data transfer is the commonly-used Ethernet system, one implementation of which, known as 10BASE-T is described in the draft Nine supplement to IEEE standard 802.3, dated Nov. 15, 1989.

Another type of non-isochronous data transfer is a token ring system. In a token ring system, a node is permitted to transmit data only after receipt of an electronic "token." As depicted in FIG. 1B, a first station may transmit a token 22a which is received 24a by a second station whereupon the second station may begin transmission of data 26a. After a period of data transmission, the second station transmits the token 22b which is received by a third station 24b that can then begin its own transmission of data 26b. As seen in FIG. 1B, because data transmission is synchronized with the occurrence of an event (the arrival of a token), the token ring system is not an isochronous data transfer system. One commonly used token ring Network is described in IEEE standard 802.5.

In contrast, FIG. 1C schematically depicts isochronous data transfer. In isochronous data transfer, the data transfer or "connection" is initiated, such as by initiating a telephone conversation or beginning a video camera transmission 30. After the connection is initiated, transmission of the data, possibly accompanied by transmission of housekeeping information (such as destinations, audio or video timing, and the like) is provided substantially continuously for an indeterminate period, such as until termination of the connection. Although it may be that not every bit transferred represents a data bit (since "housekeeping" bits may be also transferred), the transfer of data is substantially continuous in the sense that there are no substantial periods during which no data bits are transferred. It is possible that the data being transferred is "Null" data such as silence during a telephone conversation or transfer of a blank video image. One type of isochronous data transfer is the Fiber Distributed Data Interface-II (FDDI-II) as described, for example, in *FDDI-II Hybrid Multiplexer*, Revision 2.4, dated Mar. 25, 1991.

Accordingly, it would be advantageous to provide an isochronous data communication system in which packetized data, such as Ethernet data, can be transferred across the physical media in a non-packetized frame structure. Preferably, the frame structure can accommodate both the packet-source data and non-packet-sourced data such as isochronous data. Preferably, the system would be substantially backwards-compatible for example with an existing Ethernet system so that existing nodes, e.g. non-isochronous nodes, could be put on the isochronous network and would be able to operate normally. The non-isochronous nodes could later be upgraded to take advantage of isochronous capability, as desired.

SUMMARY OF THE INVENTION

The present invention provides for transmitting packet-source data in a frame structure by re-timing the data, such as using a buffer to position bit groups of the data in predetermined time slots of recurring time frames or templates. In this way, data which is received in a packetized form is transmitted across the physical media in a frame form which is not itself packetized. Preferably, other time slots in each frame are used to transmit non-packet-source data such as isochronous data. Furthermore, other time slots can be used for frame start information, "D channel" information and/or M channel information. In this way, one portion of bandwidth on the link is dedicated to conveying the packet-source data and another portion of the bandwidth portion on the link can be dedicated to conveying non-packet-source data such as data to and from isochronous sources and sinks. Because the various types of data have dedicated bandwidths available to them, the transmission of one type of data, and particularly the effective data rate of the transmission, is independent of changes which occur in the other types of data. For example, the effective data rate of the isochronous data is unchanged by changes in demand or traffic in the non-isochronous data or by interruptions in the non-isochronous data (such as data collisions in the case of Ethernet data or a token loss in the case of token ring data).

The system of the present invention can be provided so that it is transparent to previously-available Media Access Controllers ("MACs") such as Ethernet MACs and token ring MACs. In this embodiment, a system of buffering can be provided to convert between the packetized or token ring non-isochronous data which is output from or input to the MAC, and the frame-based data stream. In another embodiment, a new media access controller can be provided which receives data, source and destination information in the same fashion as previously available media access controllers, and outputs data at the proper time and rates needed for filling the predetermined time slots. Thus, in this embodiment, it is not necessary to provide an additional buffer downstream from the media access controller for re-timing the output from the media access controller.

Preferably it is possible to use previously available physical media, such as twisted pair media, without degrading data rates achieved previously on the media, such as data rates achieved on previous Ethernet or token ring networks. In one embodiment, functionality of previously available physical media is preserved by using an efficient coding scheme permitting a given amount of bandwidth to convey both isochronous traffic and previous types of data traffic such as Ethernet or token ring-type traffic.

In one embodiment, data from an isochronous data source is time-division multiplexed with the data output from a packet source such as the data output from the media access controller from a previously available packet-form network node. These two data streams are preferably also multiplexed with maintenance data ("M channel") and connection control ("D channel") data (such as destination, source bandwidth and status information). In this embodiment, the various types of data are time-division-multiplexed in a repeating frame structure or template. The template is constructed to satisfy the data rate requirements of the various data sources and sinks. For example, a typical Ethernet source/sink requires that no more than 800 ns separate two contiguous data bytes. In one embodiment, services provided over each link include a transparent full duplex isochronous channel of 6.144 Mb/s (which is switchable at 64 Kb/s granularity), a 64 Kb/s D channel, a 96 Kb/s M channel a 10 Mb/s packet channel for bandwidth sharing between nodes and 80 Kb/s bandwidth for transmitting additional information.

The data streams are encoded for transmission using an efficient coding scheme which permits packet-sourced data to be transmitted at a rate not substantially smaller than, preferably substantially equal to, the data rate at which the packet-sourced data was transmitted according to previously available network systems. In one embodiment, a four/five encoding scheme is used. The four/five encoding scheme provides for a number of non-data symbols. In one embodiment, the extra data symbols can be used in emulating aspects of the packet data sources and sinks to permit transmission of packet-sourced data embedded in a frame-based data transfer system. The data which is transferred across the physical media includes both data which originated in packet form, i.e., packet-sourced data, and data which did not originate in a packet-sourced form, e.g., isochronous data. Both types of data are transferred in substantially similar ways across the physical media, .e., in predetermined time slots of recurring time frames. Although the two types of data are in a similar form as they travel cross physical media, the two types of data will be separated upon arrival at the far end (such as a hub and/or nodes). Since only predetermined positions of the time slots in each time frame are used for each of the various types of data, it is possible to separate the packet-sourced data from the isochronous-sourced data even though the form of the two types of data, as they travel across the physical medium, appears identical.

Preferably, the present system is implemented as a star-topology network with data sources transmitting to a central hub which, in turn, transmits the data to data sinks. A single node can act as both a source and a sink. Several such star-topology systems can be connected by providing interconnection of the hubs, for example, in a ring structure (FIG. 3) or a tree structure. The multiplexed data which arrives at the hub is de-multiplexed to separate the isochronous-source data, the packet-sourced data, the D channel, M channel and any other time-multiplexed data. The packet-sourced data can be provided to hub circuitry specialized for handling the packet-sourced data stream. In one embodiment, circuitry in the hub will convert the separated packet-sourced data stream into a form substantially similar to the form the data stream would have after arrival over a previously available packet network. For example, where packet data is sourced from an Ethernet MAC, the hub will convert the separated non-isochronous data to a form such that it can be properly handled by standard Ethernet hub repeater circuitry. The separated isochronous data is conveyed to locations where it can be transmitted to the destination nodes of the network. In another embodiment, where it is not desired to make use of previously-available hub repeater circuitry, the separated packet-sourced data is first conveyed to those locations where it will be transmitted to the destination nodes without first converting it into a form similar to the form it would have had after arrival ever a previously-available packet network.

In another embodiment, the separate packet-sourced data can be bridged to the destination using address filtering, i.e., by extracting destination data from the packet information and using this information to route packets to the destination.

The hub contains multiplexers for combining both isochronous-sourced data and packet data, e.g., from Ethernet hub repeater circuitry. These data sources, along with M channel, D channel data, and any other desired data, are multiplexed in a fashion similar to the multiplexing which occurred at the nodes and the multiplexed data is transmitted back to the nodes, preferably over a separate set of one-way twisted pair media. The nodes contain de-multiplexers, similar to those found in the hub, for separating the isochronous-sourced data, packet-sourced data and D channel, M channel and other data streams. The separated packet-sourced data is preferably converted to a form compatible with previously available media access controllers, such as the media access controllers which sourced the packet-sourced data. The isochronous data may be provided to isochronous data sinks connected to the node.

To provide for high quality of service, it is desirable to reduce the delay or jitter of the transmitted data. In one embodiment, the amount of buffering is selected to reduce or minimize delay and jitter. In another embodiment, delay is reduced by pre-filling buffers, e.g., by partially filling buffers with preamble symbols.

The frame structure used for transmission over the media provides a data rate which, while substantially constant over a long time frame, is variable over a short time frame (such as less than one template) and buffering can be used for smoothing the varying data rate to provide compatibility with, e.g. previously available MACs.

BRIEF DESCRIPTION OF THE DRAWINGS

FIGS. 1A, 1B and 1C are schematic diagrams of the timing of a packet transmission system, a token ring transmission system, and an isochronous transmission system respectively.

FIG. 11 is a timing diagram showing, separately, the timing of time slots used for the frame synchronization, packet data and non-packet data during the initial portion of a frame structure as shown in Table I, according to an embodiment of the present invention.

DETAILED DESCRIPTION OF THE PREFERRED EMBODIMENT

Figure 2:
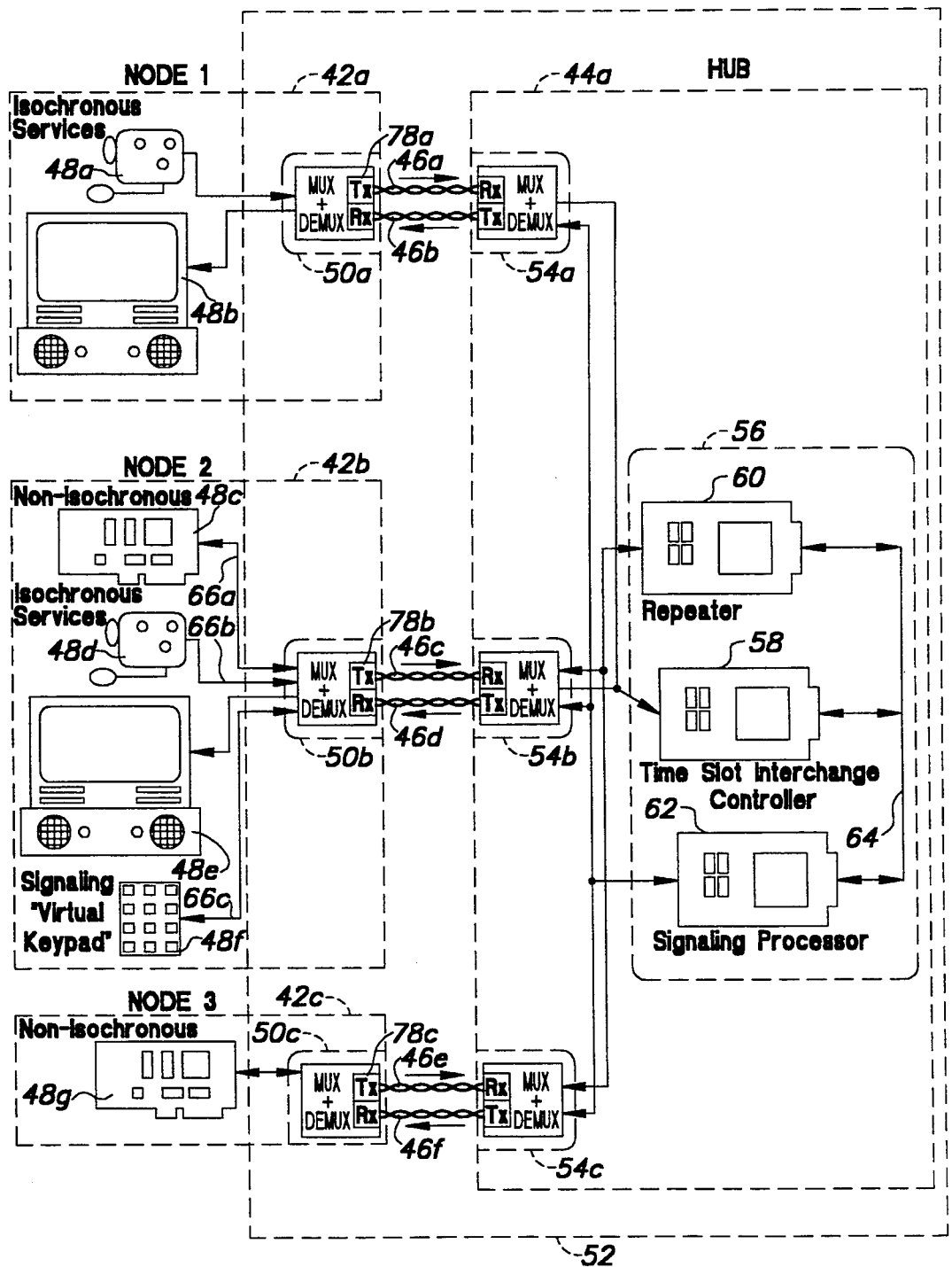
FIG. 2 is a schematic block diagram showing three nodes connecting to a hub card according to one embodiment of the present invention.
Figure 3:
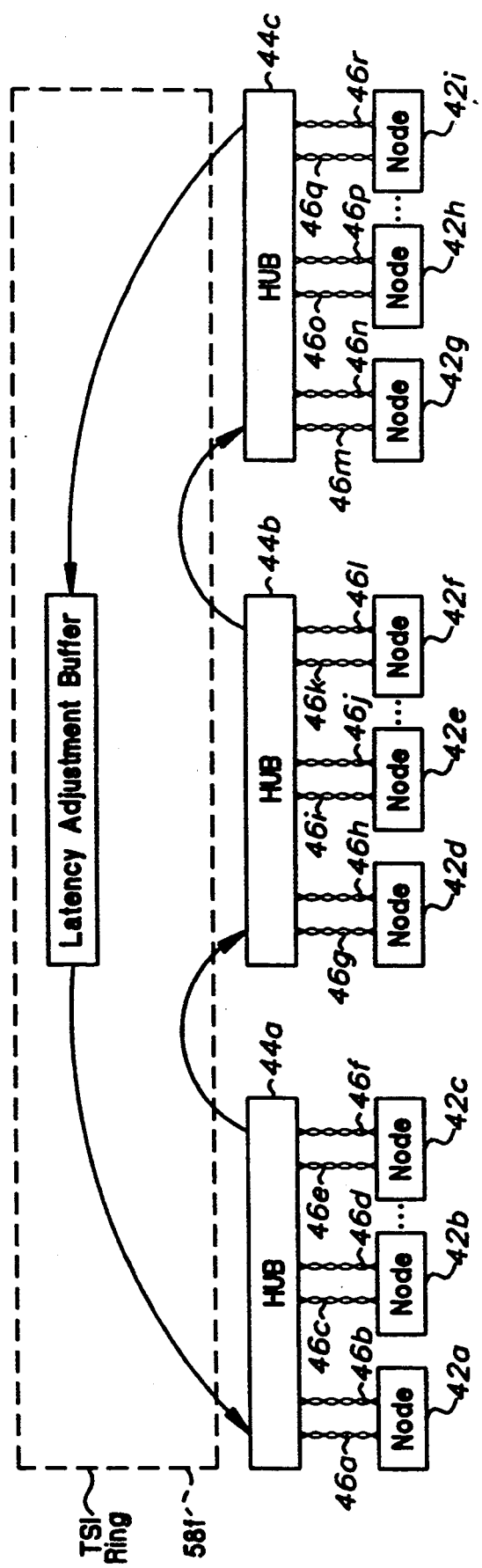
FIG. 3 is a schematic block diagram showing a number of hubs connected together using a ring structure.

According to an embodiment of the invention, a data communication system for packet-sourced data, preferably mixed with isochronous-sourced data, can be configured in a startopology with a plurality of nodes 42a, 42b, 42c, (FIG. 2) each coupled to a hub 44a by data links comprising physical data transmission media such as one-way twisted pair wires 46a–46f. The number of nodes can be adjusted depending on the data transmission needs and objectives of the system. In one embodiment, each hub is configured to accommodate connection with up to 16 nodes. Each node 42a, 42b, 42c includes circuitry 50a, 50b, 50c for receiving data, converting it to a form suitable for transmission onto the physical media 46a, 46c, 46e and receipt of signals from the physical media 46b, 46d, 46f and conversion to a form suitable for use by the data sinks. Each of the nodes 42a, 42b, 42c includes data sources and sinks 48a–48g. The data sources and sinks can be isochronous sources and sinks such as video cameras 48a, 48d and monitors 48b, 48e, packet sources and sinks such as an Ethernet media access controller 48c, 48g, and control signaling or D channel sources and sinks such as an emulated or virtual key pad 48f provided, for example, on a personal computer (PC) terminal. Each of the nodes 42a, 42b, 42c can include various types of sources and sinks, e.g., strictly isochronous sources and sinks, such as depicted for node one 42a, strictly packet-based sources/sinks as depicted for node three 42c or both isochronous and packet sources and sinks as depicted for node two 42b. The physical layer 52 of the network system depicted in FIG. 2 includes the node data receivers and converters 50a, 50b, 50c, the physical media 46a–46f and the hub 44a.

The hub 44a includes circuitry 54a, 54b, 54c for receiving data from the physical media 46a, 46c, 46e separating the isochronous-sourced data from the packet-sourced data, the D channel and M channel data and converting separated data into a form suitable for handling by downstream hub circuitry 56. In the depicted embodiment the separated isochronous-sourced data is provided to a time slot interchange controller for placing the data on a high-bandwidth bus so that it can be transported to and retrieved by hub circuitry 54a, 54b, 54c for transmission to various destination nodes 42a, 42b, 42c. The separated packet-sourced data is provided to circuitry 60 configured to convey the non-isochronous data to the hub circuitry 54a, 54b, 54c for transmission to destination nodes 42a, 42b, 42c. In an embodiment in which packet-sourced data includes Ethernet data, the hub circuitry 60 can be a standard Ethernet repeater processor. In this way, a system which incorporates the present invention can be at least partially backwards-compatible with previous Ethernet hub systems. The D channel and M channel data is provided to a signaling processor 62 which performs various maintenance and control functions such as identifying and alerting users of error conditions, and setting up requested connections, i.e. source/destination paths e.g. by communicating with the isochronous and non-isochronous controllers 58, 60, e.g. over data path 64.

Figure 4:
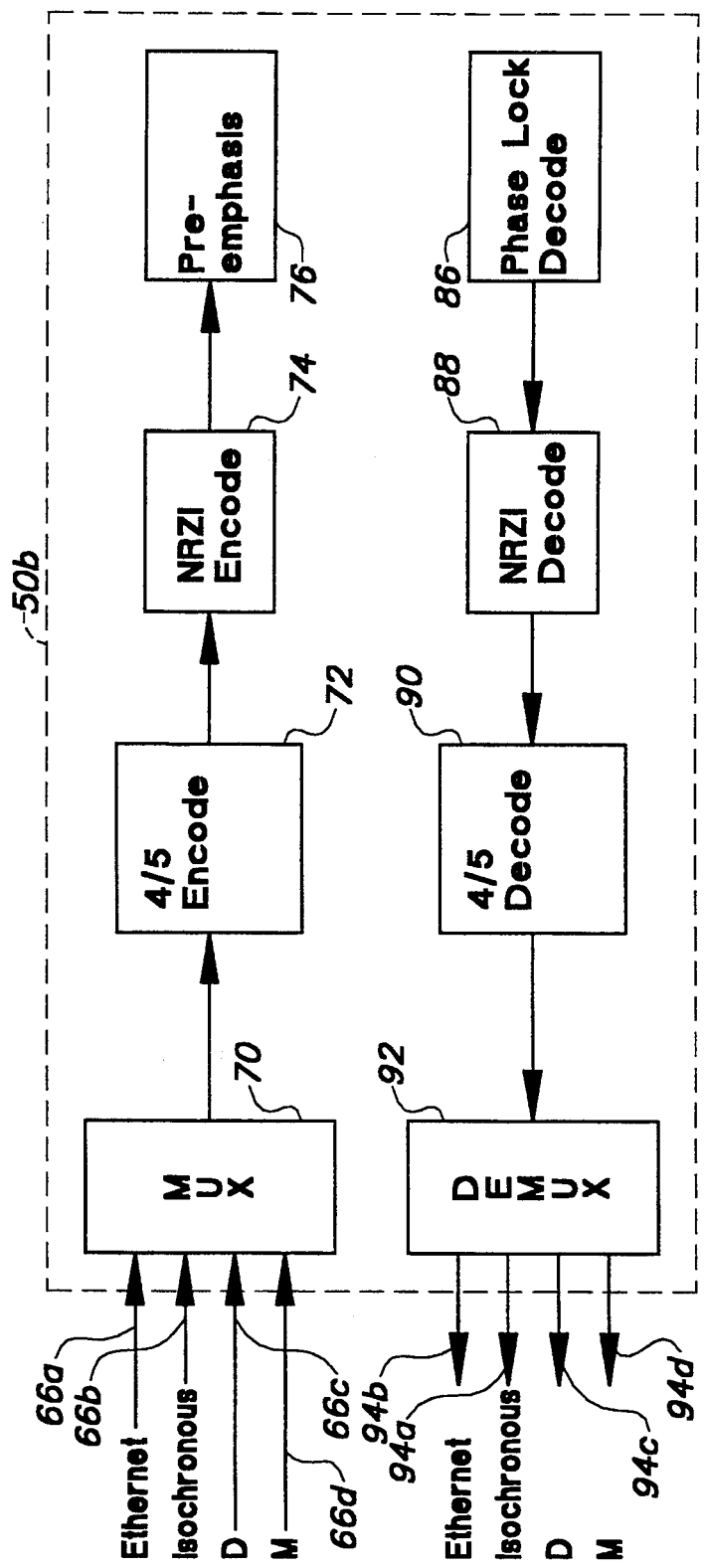
FIG. 4 is a block diagram depicting the multiplexing encoding/decoding and pre-emphasis circuitry.

Data sent from isochronous device, e.g., 48d is a continuous stream of digitized data from e.g. a video camera. In one example, the data from isochronous device 48d will be taken as having a data rate equal to the American "T1" standard of 1.544 Mb/s. Data output from the Ethernet MAC 48c is provided at the standard 10BASE-T Ethernet rate of 10 Mb/sec. D channel information is provided from a D channel data stream source, preferably contained in a MAC or other circuitry in the system or, for example, from the virtual keypad 48f at a variable data rate, such as a rate not exceeding about 64 Kb/sec. These incoming data streams are provided over lines 66a, 66b, 66c to node circuitry 50b (FIG. 4). The incoming data from the various sources is provided to a multiplexer 70 which performs time-division multiplexing on a four-bit basis. The pattern for the time-division multiplexing is a repeating series of frames or templates. In this embodiment of the invention, the frames are repeated every 125 microseconds.

A description of the operation and depicted embodiment of the present invention will be provided by way of describing the transfer data from an Ethernet media access controller 48c and an isochronous source 48b over physical media 46 to hub 44 and then back to a media access controller of 48c and isochronous sink 48b.

Figure 7A:
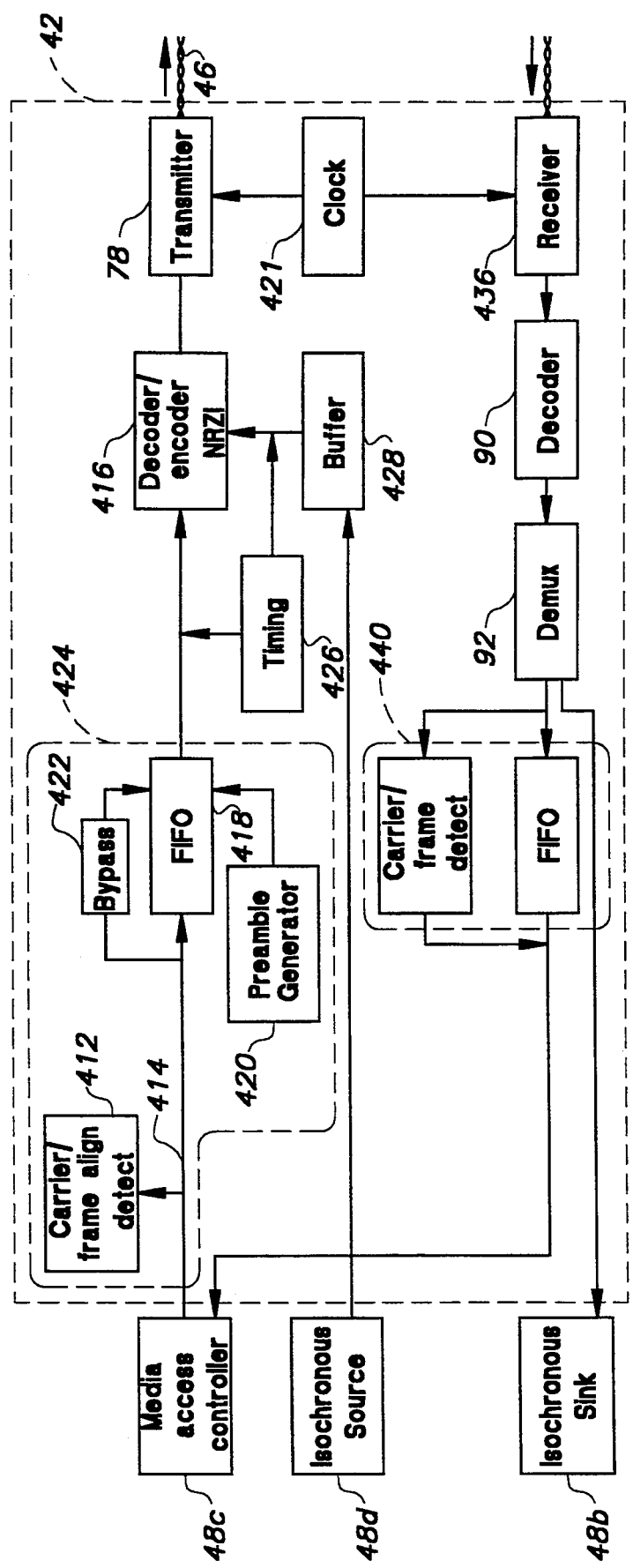
FIGS. 7A and 7B are block diagrams depicting handling of data sent from a media access controller and an isochronous source to a hub and returned to the media access controller and an isochronous sink according to an embodiment of the present invention.
Figure 10A:
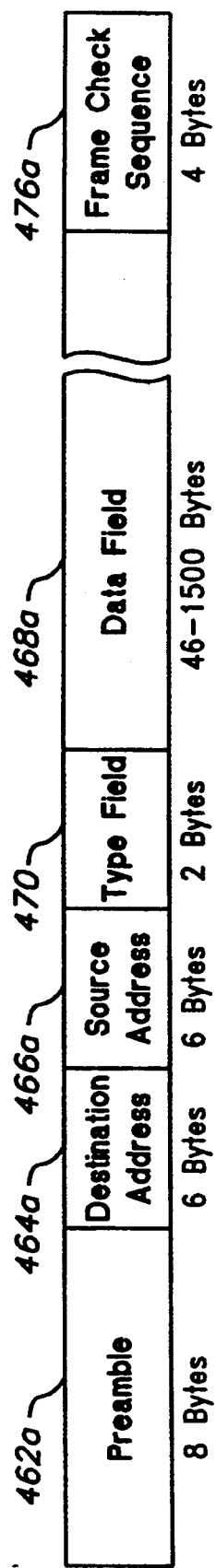
FIGS. 10A and 10B are block diagrams depicting frame formats for packet systems.
Figure 10B:
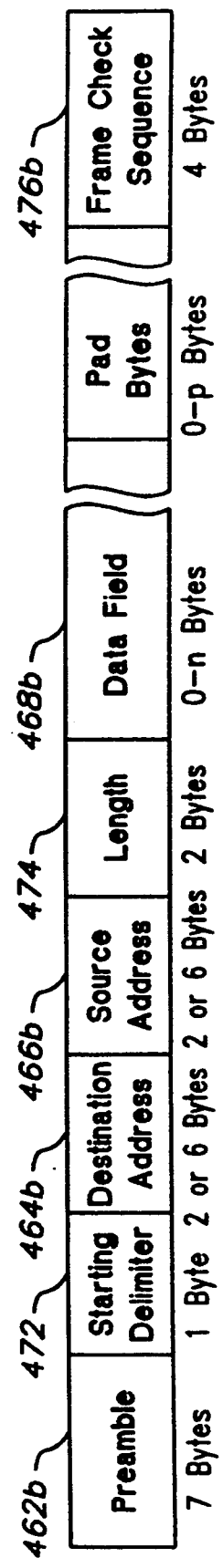

A number of frame formats are used in different implementations of Ethernet systems, two of which are depicted in FIGS. 10A and 10B. In a typical Ethernet system, the initial portion of the frame includes a number of preamble bytes 462a, 462b. The frame also includes destination address information 464a, 464b, source information 466a, 466b, and data fields 468a, 468b. Depending on the particular frame format used, the data field could be between 46 and 1500 bytes in length (468a) or between 0 and n bytes (468b). Additional frame fields which may be provided, depending on the Ethernet system implementation include type fields 470, starting delimiters 472, length fields 474, and frame check sequence fields 476a, 476b. In a typical Ethernet system, the output of an Ethernet frame can be detected by the presence of a carrier signal on the medium. Thus, in a typical sequence, a media access controller would not output any carrier for an amount of time then (depending on the particular collision avoidance system implemented for the Ethernet system) would output a frame such as those depicted in FIGS. 10A and 10B which would be accompanied by the presence of a carrier signal on the medium. When the media access controller had finished outputting the frame, there would again be no carrier on the medium. In the embodiment depicted in FIG. 7A, circuitry 412 is connected to the output 414 from the media access controller 48c which detects the presence or absence of a carrier. As described more fully below, the frame structure for transmitting the packet-sourced data is a continuously repeating frame structure so that there will always be a carrier signal on the physical medium 46 while the system is in operation. Since the presence or absence of a carrier, is important to the destination (i.e., both the hub repeater 60 and the ultimate node destination 48c) the carrier/no-carrier information should be preserved. In the embodiment depicted in FIG. 7A, this is achieved by instructing a decoder/encoder 416 to output a bit group which is reserved for indicating the absence of a carrier. This "no-carrier" bit group will be inserted in the time slots reserved for the packet-sourced data until such time as a packet is output from the media access controller.

When the packet is output by the media access controller, the packet of data is input to a first-in-first-out ("FIFO") memory 418. The FIFO 418 is needed for re-timing the data. A packet output by the media access controller will contain a member of 8-bit bytes of data, e.g., between 72 and 1526 bytes per frame. These will be output by the MAC at a predetermined data rate. For example, during transmission of a given frame of Ethernet data, one byte will be transmitted every 800 nanoseconds. However, this data rate, on a small time frame, is different from the rate at which the packet data will be placed on the physical medium 46. The data is output on physical medium 46 in 125 microsecond frames, each frame having 256 bytes. Accordingly a 4 bit nibble is output every 0.2441 sec, 450. However, not every time slot is used for packet-sourced data. Referring to Table I, and FIG. 11 after the output of the first 4 bits of Ethernet data 452, there will be a wait of 0.2441 sec (during which, isochronous data 454 will be output). This pattern will be repeated six times 456, after which, there will be a transmission of five nibbles of Ethernet data contiguously 458. Thereafter, there will be another wait of 0.2441 sec 460 and so forth.

Thus, a given Ethernet packet of data will be output from the MAC at a substantially continuous rate (during the packet transmission) of one byte every 800 nanoseconds. However, the data will be placed onto the medium 46 in a discontinuous "lumpy" fashion with several contiguous time slots devoted to transmission of packet-data, but with other packet-data nibbles requiring delays between transmission. The FIFO 418 is provided to accommodate this pattern so that the packet data can be input in a continuous fashion (during a packet output from the MAC) and output from the FIFO, as needed, in a discontinuous nibble-wise fashion.

One of the costs of using a FIFO is the introduction of latency, which is preferably reduced or minimized. Certain parameters of the network system are based on the apparent size of the system, i.e., the size that the system appears to have, based on the amount of delay or latency observed. An increase in latency in this system increases the apparent size of the system without providing any actual increase in size. Thus, if the system nominally has a maximum link length of 100 m, increase in latency of this system effectively decreases the maximum length the physical wires can have. For these reasons, the increased latency introduced by the FIFO can be particularly undesirable since it increases the apparent size of the network, therefore limiting the maximum physical size of the network.

In one embodiment, the FIFO 418 is configured so that it must be filled to a predetermined threshold before any data is output. For example, if the FIFO 418 holds 10 41-bit nibbles of data, in one embodiment the FIFO must contain at least 5 nibbles of data before output can commence. Because of the threshold requirement for the FIFO 418, there is a certain latency, i.e., there is a delay between the time the data is initially input into the FIFO and the time when the threshold is reached, to permit output from the FIFO. According to one embodiment, the delay from the FIFO is reduced by partially filling the FIFO with preamble symbols. In this embodiment, as soon as a packet of data from the media access controller 48c begins entering the FIFO, the preamble generator 420 fills the FIFO 418 half-full of preamble bytes. This immediately meets the threshold requirement of the FIFO so that output can begin, reducing the latency of the FIFO. This reduction in latency is achieved at the cost of increasing the length of the preamble.

Another latency introduced by the FIFO is a propagation latency, i.e., even in the absence of a threshold latency, there is a certain amount of time required between the time a bit of data is input into the FIFO and the time it has propagated into the point where it can be output from the FIFO. According to another aspect of the invention, the presence of a preamble byte is detected before or as the frame enters the FIFO. Circuitry 422 is added to by-pass some of the propagation of ordinary data through the FIFO, to propagate the preamble through the FIFO with a latency shorter than the propagation latency of normal data.

The FIFO 418, detect circuitry 412 and the optional circuitry 422 constitute a buffer circuit 424. Timing circuitry 426 controls the rate at which nibbles are output from 418. The timing is configured as to convey data to the transmitter 78 at the proper time slots in accordance with a predetermined template, such as that shown in Table I. Timing circuitry 426 also controls the flow of isochronous data through the decoder/encoder 416, preferably by controlling the output buffer 428 which receives data from isochronous source 48d.

Table I depicts the manner in which the various data streams, and additional data and control bytes are time-division multiplexed. Each symbol in Table I represents four bits of data so that every group of two symbols represents one 8-bit byte of data. In Table I, E represents four bits of data from the Ethernet stream 16b, B designates four bits of data from the isochronous stream 66a, D represents four bits of data from the control signaling or D channel stream 66c, and M represents four bits of maintenance data as described below. In addition, certain byte-length patterns are provided. JK represents a frame synchronization pattern and EM (the first two bytes of block three in Table I) represents an Ethernet "pad" followed by a maintenance nibble as described below. As seen in Table I, each frame contains 256 bytes which can be considered in thirty-two groups of eight bytes each, or four blocks of sixty-four bytes each. The frame structure is described more thoroughly in commonly-assigned application Ser. No. 07/969,911 (Attorney File No. 8332-315/NS-2024), titled "Network for Transmitting Isochronous-Source Data with a Frame Structure", filed on even date herewith and incorporated herein by reference.

particular purpose. Preferably, the frame has one or more time slots which can be used for adjusting the data rate to the particular data rate requirements of various data sources and sinks. For example, one or more time slots can be designated as rate-adjustment slots. The rate adjustment slots can be used to carry the specified type of data during some time frames but do not carry that specified type of data during other time frames. For example, In table I, the first symbol of Block 3 can be designated as an Ethernet "pad". By alternating this time slot so that it is used to carry Ethernet data during even-numbered time frames and to carry a "no data" symbol during odd-numbered time slots, a data rate adjustment which is, on average, equal to one half of the bandwidth represented by a single time slot can be achieved.

The transmitter will have its own clock 421 which is preferably used to transmit frames at times determined

TABLE I

| BLOCK 0: | | | | | | | | | | | | | | | |
|---|---|---|---|---|---|---|---|---|---|---|---|---|---|---|---|
| J | K | E | B | E | B | E | B | E | B | E | B | E | B | E | Group 0 |
| E | E | E | B | E | B | E | B | E | B | E | B | E | B | E | Group 1 |
| E | E | E | B | E | B | E | B | E | B | E | B | E | B | E | Group 2 |
| E | E | E | B | E | B | E | B | E | B | E | B | E | B | E | Group 3 |
| E | E | E | B | E | B | E | B | E | B | E | B | E | B | E | Group 4 |
| E | E | E | B | E | B | E | B | E | B | E | B | E | B | E | Group 5 |
| E | E | E | B | E | B | E | B | E | B | E | B | E | B | E | Group 6 |
| E | E | E | B | E | B | E | B | E | B | E | B | E | B | E | Group 7 |
| BLOCK 1: | | | | | | | | | | | | | | | |
| M | M | E | B | E | B | E | B | E | B | E | B | E | B | E | Group 8 |
| E | E | E | B | E | B | E | B | E | B | E | B | E | B | E | Group 9 |
| E | E | E | B | E | B | E | B | E | B | E | B | E | B | E | Group 10 |
| E | E | E | B | E | B | E | B | E | B | E | B | E | B | E | Group 11 |
| E | E | E | B | E | B | E | B | E | B | E | B | E | B | E | Group 12 |
| E | E | E | B | E | B | E | B | E | B | E | B | E | B | E | Group 13 |
| E | E | E | B | E | B | E | B | E | B | E | B | E | B | E | Group 14 |
| E | E | E | B | E | B | E | B | E | B | E | B | E | B | E | Group 15 |
| BLOCK 2: | | | | | | | | | | | | | | | |
| D | D | E | B | E | B | E | B | E | B | E | B | E | B | E | Group 16 |
| E | E | E | B | E | B | E | B | E | B | E | B | E | B | E | Group 17 |
| E | E | E | B | E | B | E | B | E | B | E | B | E | B | E | Group 18 |
| E | E | E | B | E | B | E | B | E | B | E | B | E | B | E | Group 19 |
| E | E | E | B | E | B | E | B | E | B | E | B | E | B | E | Group 20 |
| E | E | E | B | E | B | E | B | E | B | E | B | E | B | E | Group 21 |
| E | E | E | B | E | B | E | B | E | B | E | B | E | B | E | Group 22 |
| E | E | E | B | E | B | E | B | E | B | E | B | E | B | E | Group 23 |
| BLOCK 3: | | | | | | | | | | | | | | | |
| E | M | E | B | E | B | E | B | E | B | E | B | E | B | E | Group 24 |
| E | E | E | B | E | B | E | B | E | B | E | B | E | B | E | Group 25 |
| E | E | E | B | E | B | E | B | E | B | E | B | E | B | E | Group 26 |
| E | E | E | B | E | B | E | B | E | B | E | B | E | B | E | Group 27 |
| E | E | E | B | E | B | E | B | E | B | E | B | E | B | E | Group 28 |
| E | E | E | B | E | B | E | B | E | B | E | B | E | B | E | Group 29 |
| E | E | E | B | E | B | E | B | E | B | E | B | E | B | E | Group 30 |
| E | E | E | B | E | B | E | B | E | B | E | B | E | B | E | Group 31 |

JK = Frame Synchronization Pattern
EM = Ethernet Pad & 4 Maintenance Bits
MM = 8 Maintenance Bits
E = Ethernet Packet Channel
D = D Channel
B = Isochronous Channel The described frame structure and frame transmission rate provides data rates for the isochronous and non-isochronous data which are compatible with, e.g., 10BASE-T Ethernet data rates. In addition, the placement of different channels was chosen to minimize the amount of fifoing needed by the packet and isochronous data streams to provide a continuous flow of data. Other types of frame structures could be used in connection with other isochronous and/or non-isochronous data sources and sinks such as other types of packet-based systems, or token ring sources and sinks, in which case a different frame structure or template can be used to provide an allocation of bandwidth suited for the by a reference clock. The frame length can be adjusted to accommodate differences (usually, small differences) in clock rates between the transmit clock and the reference clock. This causes loss of a packet slot which is re-inserted in the next available "pad" time slot.

The time-multiplexed data is then encoded by a decoder/encoder. The purpose of the decoder/encoder 416 is to place the nibble/wise data received from the FIFO 418 and the buffer 428 into a 4/5 encoded form. One particular form of four/five encoding conforming partially to the ANSII X3T9.5 standard, is depicted in Table II. The five bit code symbols of the particular four/five implementation have been chosen so as to maintain the AC balance of the physical medium, and to minimize the frequency spectrum of wave forms as they are transmitted along the physical medium. This eases the task of the, data decoder, which is typically a phase lock loop device, in recovering the data and the transmission clock. These patterns, when properly combined, have a maximum of three bit times with no transition. With a bit rate of 48.8 ns, the minimum transition rate is 3.41 MHz or 146.5 ns between transitions. The circuitry 416 and encodes four bits of data from the MAC 48c using the four/five encoding scheme. Circuitry 416 will also encode the data received from the buffer 428.

TABLE II

| Symbol | Encoded (5 bit) | Decoded (4 bit) | Description |
| --- | --- | --- | --- |
| 0 | 11110 | 0000 | Data 0 |
| 1 | 01001 | 0001 | Data 1 |
| 2 | 10100 | 0010 | Data 2 |
| 3 | 10101 | 0011 | Data 3 |
| 4 | 01010 | 0100 | Data 4 |
| 5 | 01011 | 0101 | Data 5 |
| 6 | 01110 | 0110 | Data 6 |
| 7 | 01111 | 0111 | Data 7 |
| 8 | 10010 | 1000 | Data 8 |
| 9 | 10011 | 1001 | Data 9 |
| A | 10110 | 1010 | Data A |
| B | 10111 | 1011 | Data B |
| C | 11010 | 1100 | Data C |
| D | 11011 | 1101 | Data D |
| E | 11100 | 1110 | Data E |
| F | 11101 | 1111 | Data F |
| I | 11111 | 1010 | No Ethernet Carrier |
| S | 11001 | 0111 | No Ethernet Data |
| V | 01100 | 0010 | Unaligned Data |
| T | 01101 | 0101 | Unassigned |
| J | 11000 | 1101 | Frame Sync Part 1 |
| K | 10001 | 1101 | Frame Sync Part 2 |
| Q | 00000 | 0010 | Invalid |
| H | 00100 | 0001 | Invalid |
| R | 00111 | 0110 | Invalid |
| V | 00001 | 0110 | Invalid |
| V | 00010 | 0010 | Invalid |
| V | 00011 | 0010 | Invalid |
| V | 00101 | 0010 | Invalid |
| V | 00110 | 0010 | Invalid |
| V | 01000 | 0010 | Invalid |
| V | 10000 | 0010 | Invalid |

The results of the four/five encoding is then further encoded by encoder 74 (FIG. 4) using a non-return to zero, inverted (NRZI) scheme. The NRZI encoder modifies the bit stream by inverting the state of the output whenever a logic 1 is to be transmitted. Logic 0 produces no change in output state. Four/five-NRZI encoding is particularly useful in networks in which the packet data source is a 10BASE-T Ethernet source. This is because the four/five-NRZI encoding allows for transmission at a signaling rate such that the data rate for the packet-sourced portion of the data is substantially compatible with the data rates provided and expected by the Ethernet MAC. In typical Ethernet systems, a data rate of 10 Mb/sec is provided. In standard Ethernet systems, the data provided at this rate is encoded using two transition times to transfer one bit of data. On average, this scheme provides one clock bit per every bit of data. Thus the standard Ethernet data rate of 10 Mbit/sec, after manchester encoding, results in a signalling rate of 20 Mbit/sec.

Comparing the standard Ethernet signalling rate and data rate to that provided by the frame structure of Table I and encoding of Table II, it is seen that in the present scheme, a frame of data contains 313 37 E" symbols or 1252 E bits. By transmitting frames at a rate of one frame every 125 microseconds, the present scheme has a capacity for transmitting 10.016 Mbits/sec of Ethernet-sourced data interspersed with 6144 Kbits/sec of isochronous data. Thus by using the four/five-NRZI encoding, the data rate and signaling rate is within two and one-half percent of the signaling and data rate used by 10BASE-T, allowing both isochronous traffic and Ethernet traffic to travel over existing physical media 46 without seriously degrading the data rate of the Ethernet traffic, compared to previous standard Ethernet systems. Moreover, provision of substantially standard Ethernet data rates contributes to the ability to implement the present invention without the necessity for replacing in-place MACs or repeater circuitry. The ability to convey data frames substantially at the signaling rate used by previously-available systems, such as standard Ethernet, contributes to the ability to implement the present invention without the necessity to replace in-place physical media, such as twisted pair media.

The encoding scheme preferably has sufficient efficiency that the bandwidths of both the incoming non-isochronous data 66b and the incoming isochronous data 66a can be accommodated on the physical media 46 without serious degrading, preferably without any degrading, of bandwidth formerly available for the non-isochronous data. The four/five encoding scheme is more efficient than differential manchester encoding scheme, in this regard, since it provides four bits of data for every five potential transitions so that, on average, one clock bit is provided for every four bits of data (as opposed to one clock bit for every data bit in differential manchester encoding). Thus, whereas in previous standard Ethernet systems, the differential manchester encoded data took up substantially the entire bandwidth of the twisted pair media, which has a maximum effective signalling rate of about 20 Mb/sec, the four/five-NRZI encoding permits physical media having the same bandwidth to accommodate the 10 Mbit/sec Ethernet data stream and a 6144 Kbit/sec isochronous stream, as well as a 64 Kbit/sec control signaling D channel, a 96 Kbit/sec maintenance M channel, and 64 Kb/sec for the frame synchronization pattern. Additionally, 80 Kb/s (64 Kb/s+16 Kbs) are available but undefined. These characteristics are summarized in Table 3.

TABLE III

| Channel | Bytes/Frame | Bits/Frame | Kbits/sec | Usage |
| --- | --- | --- | --- | --- |
| JK | 1.0 | 8 | 64 | Frame Synchronization |
| B | 96.0 | 768 | 6,144 | Isochronous |
| E | 156.5 | 1,252 | 10,016 | Ethernet Packet |
| D | 1.0 | 8 | 64 | D channel |
| M | 1.5 | 12 | 96 | Maintenance |
| | 256.0 | 2,048 | 16.384 | Mbits/sec |

Although the four/five-NRZI encoding in particularly useful in connection with an Ethernet non-isochronous source, other types of encoding or decoding can also be used in the present systems, including a scheme encoding 8 bits into 10 bits or a scrambling scheme.

The output from the encoding devices is sent to pre-emphasis circuitry 76. The pre-emphasis circuitry compensates the signal transmitted onto the physical medium to reduce the jitter. The pre-emphasis stage is optimized for the frequency spectrum employed by the present system. The data output by the pre-emphasis circuitry 76 is sent to a transmitter or driver 78a and the signal is transmitted over the physical medium 46. The physical medium 46 can be any of a number of media types including twisted pair, coaxial or fiber optic cable.

Figure 5:
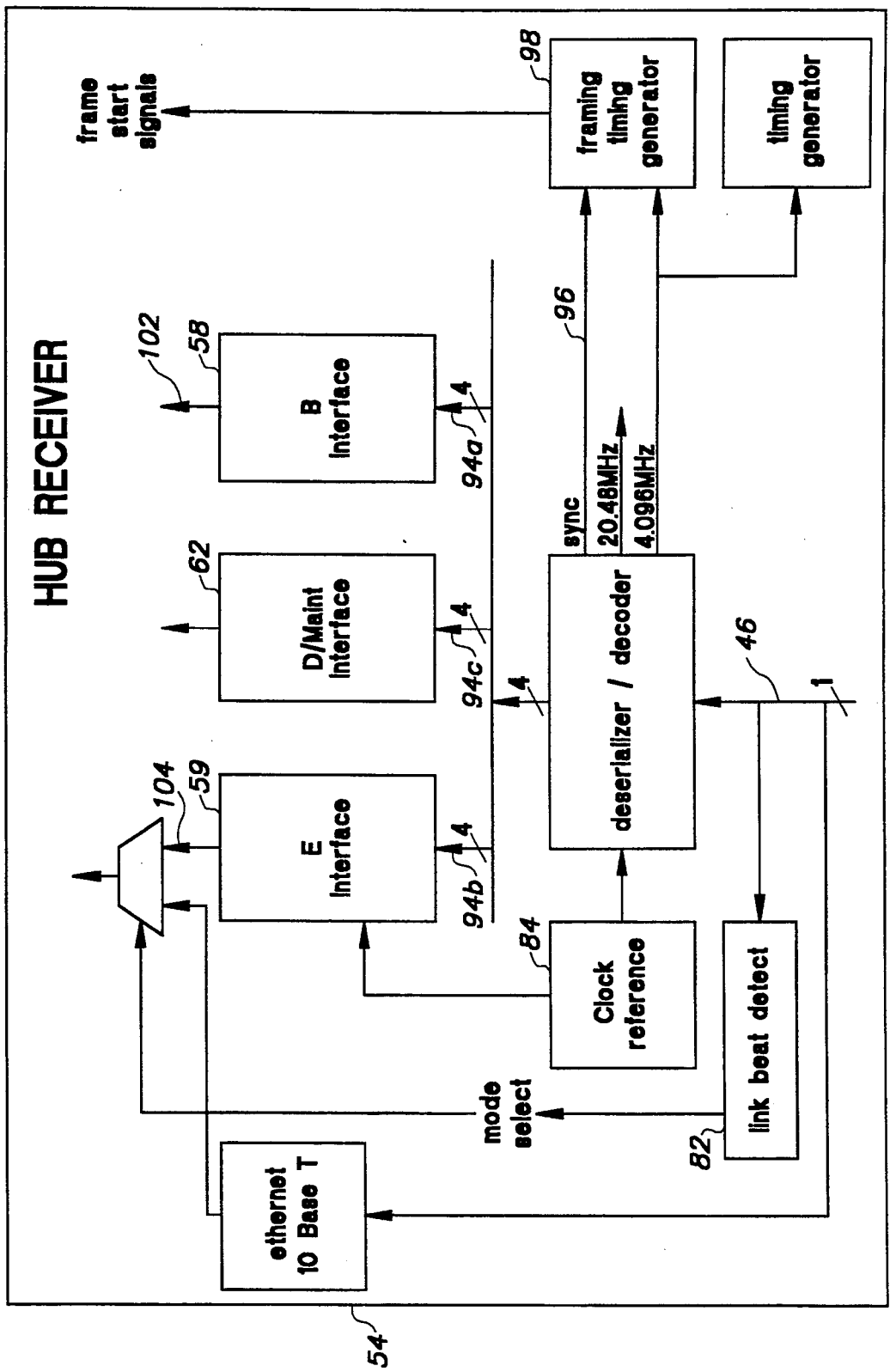
FIG. 5 is a block diagram depicting a hub receiver, according to an embodiment of the present invention.
Figure 7B:
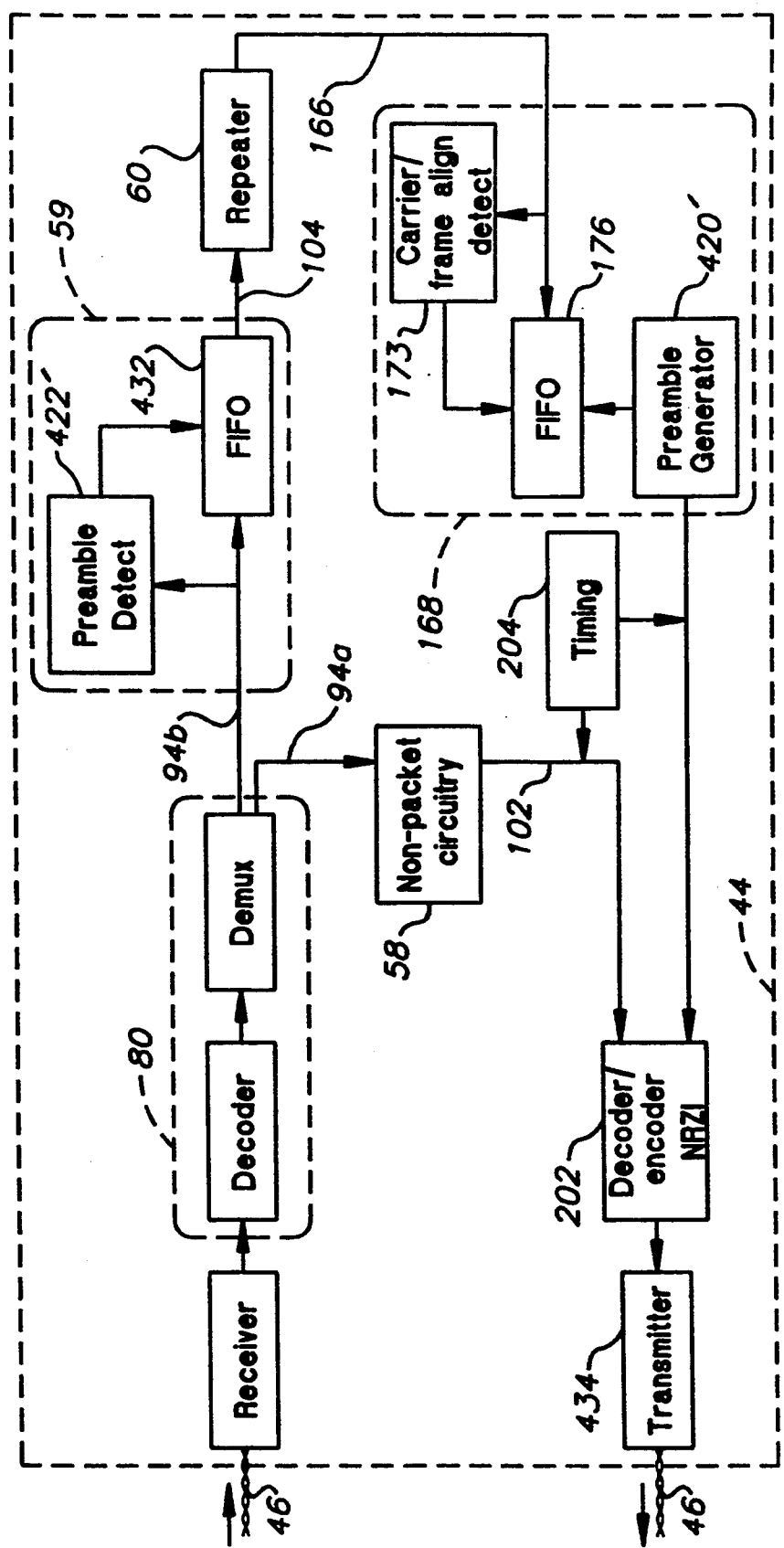

The data sent over the physical media 46a is received in the hub 44. The hub contains a plurality of circuit devices 54a, 54b, 54c, each one coupled to one of the nodes 42a, 42b, 42c by the physical media 46. As depicted in FIG. 7b, the data transmitted over the physical media 46 arrives serially at a de-serializer/decoder 80. Link detect circuitry 82 (FIG. 5) also receives the data from the physical media 46 for detection of the mode in which the node is operating (e.g. 10BASE-T or isochronous Ethernet) and outputting a mode select signal, as described more fully in commonly-assigned application Ser. No. 07/971,018 (Attorney File No. 8332-319/NS-2026, titled "Network Link Endpoint Capability Detection", filed on even date herewith and incorporated herein by reference.)

The de-serializer/decoder includes circuitry which is functionally an inverse of the multiplexing/encoding circuitry described above. Referring to FIG. 4, the deserializer/decoder includes phase lock decode circuitry 86, the results of which are provided to NRZI decode circuitry 88 which, in turn, provides the decode results to four/five decode circuitry 90, in turn providing results to a de-multiplexer 92 which separates the received data into the isochronous-sourced data 94a the packet-sourced data 94b. Signaling data, such as D channel 94c and maintenance data 94d, if present, can also be separated at this point.

Both the packet-sourced data 94b and the isochronous-sourced data 94a are made available to the various hub circuitry components 54a, 54b, 54c, as needed for transmission back to destination nodes or to connected hubs. In one embodiment, the separated isochronous data 94a and packet-sourced data 94b are reconfigured by the respective interfaces 58, 60 to provide isochronous output 102 and packetized output 104 in a form suitable for processing so as to provide the data as needed for transmission to the destination nodes. Although FIG. 7B depicts only a single incoming twisted pair and a single outgoing twisted pair, there typically will be many sets of twisted pairs, each connected to a different node. Each set of outgoing twisted pairs will be connected to its own transmitter, decoder/encoder and E transmit interface. Thus, data 102 from the non-packet circuitry 58 and data 166 from the repeater 60 are first conveyed to the proper set of output circuitry 54, i.e., the output circuitry which is connected to the destination node for that data.

In one embodiment, the packet-sourced data 94b is configured by the E interface so that the output data 104 can be processed by a repeater device 60 for provision to hub circuitry 54 and eventual transmission to destination nodes. As an alternative to using a repeater for the non-isochronous data, packet connections may be linked through media access control layer bridges. Preferably, the output data 104 is in a form such that it can be handled by repeater circuitry of types previously available. In the present example, the packet-sourced data 94b is data which originated at the node 42b from an Ethernet MAC 48c and the output data 104 is in a form such that it can be handled by a standard Ethernet hub repeater 60 such as a DP83950 "Repeater Interface Controller" (RIC) available from National Semiconductor Corporation, Santa Clara, Calif. This configuration provides the advantage that the present invention can be implemented without the necessity to replace all hub circuitry, in particular without the necessity for replacing hub repeater circuitry. In some embodiments, it may be desirable to provide the packet-sourced data 94b back to the circuitry 54 for return to the destination nodes without using previously-available repeater circuitry, such as in new network implementations where it does not matter whether the invention is implemented so as to be able to use previously-available repeater circuits.

Circuitry 59 can be used to re-time the date in a form appropriate for the repeater 60. Re-timing is necessary, at least for packet-sourced data, for reasons similar to that discussed above in connection with the necessity for the FIFO 418. In particular, the data received from the media 46 is provided in a discontinuous "lumpy" fashion. This "lumpy" data form is not acceptable for sending to repeater 60 which is configured to receive packets of data similar to the packets output by media access controller 48c. Accordingly, circuitry 59 re-times the discontinuous data to place them to a packet form. Circuitry 59 includes a FIFO 432. Circuitry can be provided to reduce the propagation latency of a FIFO, for example, by detecting the input of preamble 422 and propagating the preamble with a latency less than the normal latency of the FIFO for ordinary data.

If the repeater circuitry 60 is not of a type previously available, it would be possible to construct a repeater which can handle "lumpy" data arrival rates, and thus the need for buffering the packet data at the hub could be reduced or eliminated.

Figure 6:
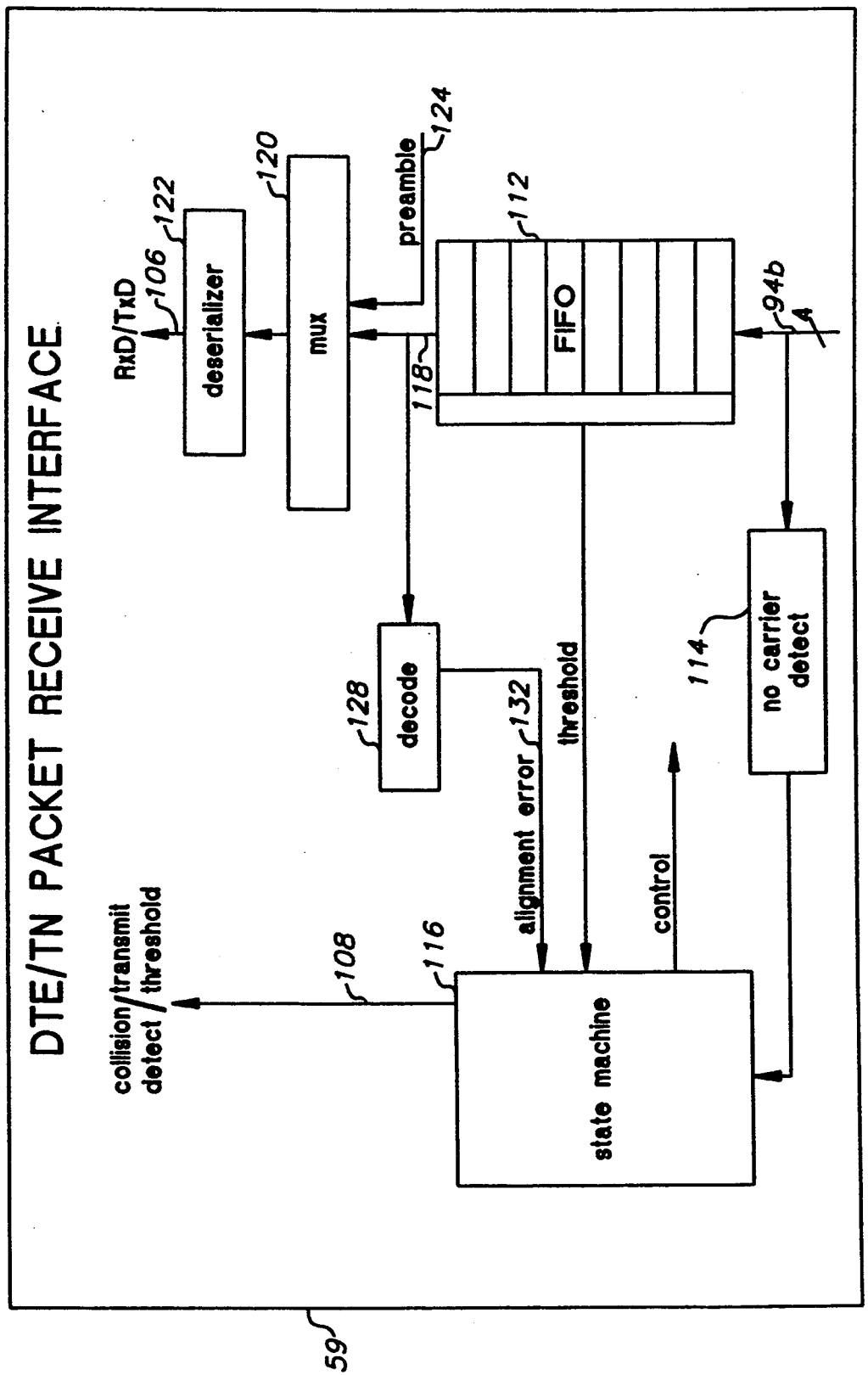
FIG. 6 is a block diagram depicting the packet receive interface, according to an embodiment of the present invention.

FIG. 6 depicts one implementation of an E interface 59 of a type which will receive the non-isochronous data 94b and provide outputs 106, 108 of a type that can be processed by previously-available repeater circuitry 60. The non-isochronous data is received in a first-in-first-out (FIFO) buffer 432 to smooth out data rates. Circuitry 114 detects "no carrier" symbols, provided to emulate Ethernet data packets, which will be used by logic circuitry or state machine 116 to output carrier detect signals. The output 118 from the FIFO 112 is provided to a multiplexer 120 and a de-serializer 122 to produce data output 106. The multiplexer 120 can receive a preamble stream 124 from a preamble generator 125 to provide the proper preamble bits in the output data 106 in a fashion similar to that discussed or the preamble generator 420. Output from the FIFO 432 is also provided to decode circuitry 128 to recognize alignment error symbols and output appropriate signals 132 to state machine 116.

Handling of the isochronous data is described in greater detail in commonly-assigned application Ser. No. 07/969,916 (Attorney Docket No. 8332-314/NS-2023) entitled "Network Communication with Isochronous Capability" filed on even date herewith and incorporated herein by reference.

Circuitry 58 can also be provided with a local loop-back capability, as described in commonly-assigned application Ser. No. 07/969,910 (Attorney File No. 8332-317/NS-2025,) titled "Local Loopback of Isochronous Data In a Switching Mechanism", filed on even date herewith and incorporated herein by reference.

Figure 9:
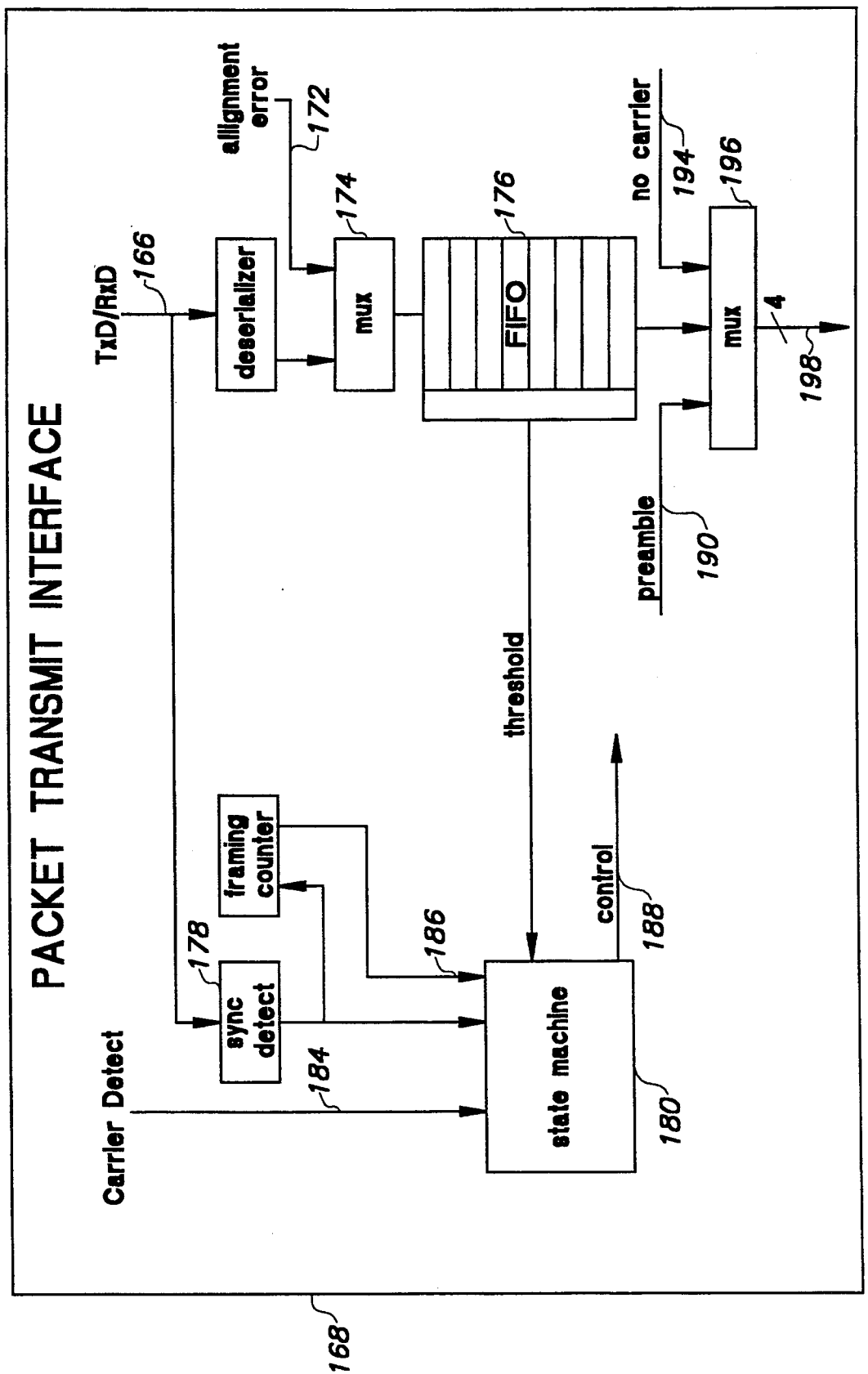
FIG. 9 is a block diagram of a transmitter according to an embodiment of the present invention.

After the hub has received data from a node and conveyed it for transmission to the destination node, the data which is intended for the destination node must be placed in a form suitable for transmission across the physical media 46. For example, data 166 output by an Ethernet repeater 60 is transformed by an E transmit interface 168 into a form suitable for supply to the encoder and transmitter. An example of an E transmit interface 168 is depicted in FIG. 9. The transmit interface depicted in FIG. 9 is, in general, the functional inverse of the E receive interface 60 depicted in FIG. 6. The data 166 can be provided in serial form or parallel form. When it is in serial form, the data 166 is de-serialized and is then combined with any necessary alignment error bits 172 (from carrier and frame align detect circuitry 173) in a multiplexer 174, the output of which is conveyed to a FIFO 176. The FIFO 176 can be provided with circuitry for reducing latency such as a preamble generator 420' A sync detect circuit 178 extracts synchronization information from the repeater output 166 for conveying to a state machine 180. The state machine 180 also receives carrier detect information 184, framing counter information 186, and provides control signals 188 to the FIFO 176. Data is extracted from the FIFO 176 as needed to make up a frame for transmission over the media 46 as described below. The data output from the FIFO 176 is multiplexed with preamble bits 190 and "no carrier" bits 194 by a multiplexer 196.

Figure 8:
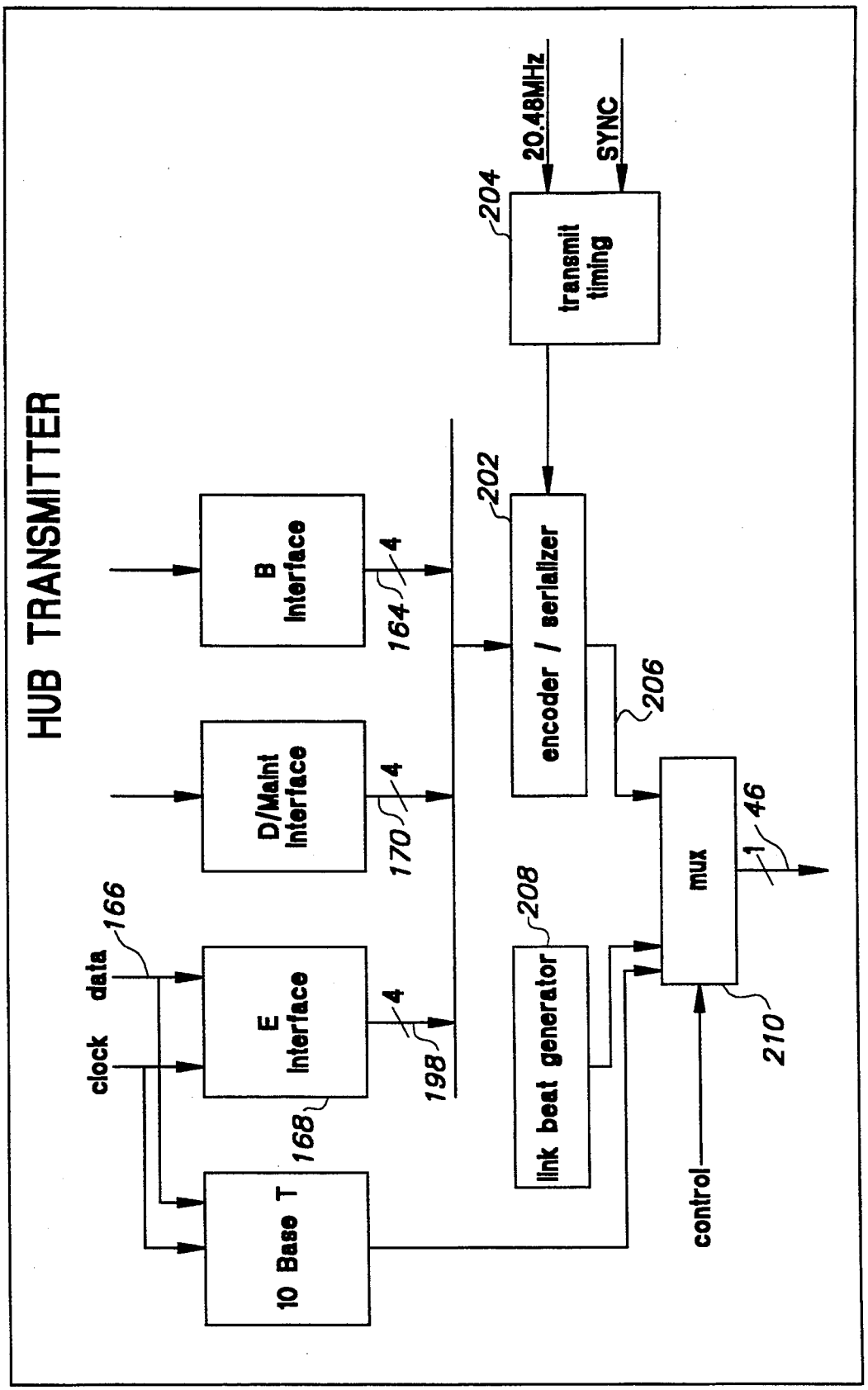
FIG. 8 is a block diagram of a packet transmit interface according to an embodiment of the present invention.

The data 198 output from the E transmit interface 168 is provided along with isochronous data output 164 and maintenance and D channel data 172 to encoder serializer circuitry 202, as depicted in FIG. 8. The encoder/serializer 202 is configured substantially like the encoding circuitry found in the node and depicted in FIG. 4. Specifically, the encoder/serializer 202 provides a multiplexer for combining the three streams of data 198, 170, 164, a four/five encoder, an NRZI encoder, and pre-emphasis circuitry. The timing of transmission is controlled by transmit timing circuitry 204. The data sent from the hub 44a to the nodes 42 is sent in a frame format which is preferably substantially the same as the frame format used for the data sent from the nodes 48 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a de-multiplexer 92. Decoded and de-multiplexed data is then delivered to the various data sinks in the nodes 42. A buffer circuit 440, substantially similar to buffer circuits 424, 59, 158 receives the separated packet-sourced data and re-times it to convert the "lumpy" discontinuous data defined by the frame structure to a packet form similar to the packet form output by the media access controller 48c.

Concepts which can be combined with the present invention include introduction of a delay in the timing scheme as described in commonly-assigned application Ser. No. 07/970,313 (Attorney File No. 8332-318/NS-2027), titled "Isochronous Link Protocol", filed on even date herewith and incorporated herein by reference and provision of FIFOs as described in commonly-assigned application Ser. No. 07/969,917 (Attorney File No. 8332-320/NS-2028), tiled "Apparatus and Method for Accommodating Cable Length Delays Using Isochronous Fifoing", filed on even date herewith and incorporated herein by reference.

In light of the above description, a number of advantages of the present invention can be seen. The present invention receives packetized data and transmits it over a physical medium in a frame format. The frame format permits both packet-sourced data and non-packet-sourced data to be transmitted during each time frame. Both packet-sourced data and non-packet-source data can have dedicated bandwidths available for transmission. The bandwidth available for the packet-sourced data is large enough to achieve a data rate similar to that obtained in previous packetized networks by using an efficient 4/5 encoding scheme. The 4/5 encoding scheme contains symbols in addition to those which are available for transmitting information from prior devices for handling for packet data, including "no carrier" information and frame alignment information. In one embodiment, a FIFO is used to re-time the packet-sourced data for use in the frame structure. Latencies of the FIFOs are reduced by pre-filling all or a portion of the FIFO with packet preamble symbols. In one embodiment, the media access controller does not output preamble symbols and preamble symbols are generated in the buffer circuitry.

A number of modifications and variations of the invention can also be used. The present invention could be used for transmitting only packet-sourced data without the need for connection to isochronous or other packet sources or sinks. Packet-based data other than Ethernet data can be accommodated by the present invention with appropriate changes to the frame template, including token ring or token bus. Although according to one embodiment of the invention, the network circuitry can be provided in a form which is compatible with previous media access controllers and/or previous hub repeater circuitry, is also possible to provide the present invention in a form where it is not necessary to assure compatibility with previously available media access controllers or hub repeater circuitry. The encoder/decoder/NRZI circuitry can be placed either before or after the buffer circuitry.

Although the present invention has been described by way of preferred embodiments and certain variations and modifications, other variations and modifications can also be used, the invention being defined by the following claims.

What is claimed is:

1. Apparatus for conveying data from a data source, over physical media, to a data sink, said data source including a media access controller which outputs first data in a packet form, the apparatus comprising:

a first buffer, coupled to said media access controller for receiving said first data in packet form and outputting at least said first data as a first plurality of groups of bits of said first data;

a first encoder for receiving and encoding at least said first data and outputting encoded data;

a clock-responsive transmitter coupled to said encoder for receiving said encoded data and coupled to said physical media for transmitting said encoded data onto said physical media, a reference clock, coupled to said transmitter, for establishing the beginning times of a plurality of contiguous time frames, each time frame having a plurality of time slots, wherein each of said first plurality of groups of bits is transmitted by said transmitter during a first set of predetermined ones of said time slots, at least some of said first set of predetermined ones of said time slots being non-contiguous.

2. Apparatus, as claimed in claim 1, further comprising:

an isochronous data source outputting isochronous data;

a second buffer for receiving said isochronous data and outputting a second plurality of groups of bits of said isochronous data;

said transmitter coupled to said second buffer for receiving said second plurality of groups of bits of said isochronous data wherein each of said second plurality of groups of bits is transmitted by said transmitter onto said physical media during a second set of predetermined ones of said time slots, said second set being different from said first set wherein the data placed on said physical medium during at least one of said time frames includes both said encoded data, originating from said media access controller and said second plurality of groups of bits, originating from said isochronous data source.

3. Apparatus, as claimed in claim 2, wherein said transmitter transmits said second plurality of bit groups at a second effective bandwidth of about 6.144 Mb/sec.

4. Apparatus, as claimed in claim 1, wherein said media access controller is an Ethernet media access controller.

5. Apparatus, as claimed in claim 1, wherein said first outputs said encoded data in a first encoded form according to a 4/5 encoding scheme wherein 4 bits are encoded into a 5-bit group.

6. Apparatus, as claimed in claim 5, wherein said first encoder includes an NRZI encoder.

7. Apparatus, as claimed in claim 1, wherein each of said first plurality of groups of data bits includes the same number of bits.

8. Apparatus, as claimed in claim 7, wherein said number of bits is 4.

9. Apparatus, as claimed in claim 1, wherein said transmitter transmits said first plurality of bit groups at a first effective bandwidth of about 10 Mb/sec.

10. Apparatus, as claimed in claim 1, wherein said first buffer comprises a first-in-first-out memory.

11. Apparatus, as claimed in claim 1, wherein
said media access controller outputs a carrier signal during at least a first time period, does not output said carrier signal during at least a second time period which occurs after said first time period and outputs said carrier signal during a third time period which occurs after said second time period, and wherein
said first encoder outputs at least a third bit group in response to receipt of the media access controller output which occurs during said second time period, said third bit group being different from any of the bit groups output by the first encoder during said first and third time periods, to provide a no-carrier indication.

12. Apparatus, as claimed in claim 1, wherein said data sink includes output circuitry and a repeater for conveying said encoded data to said output circuitry, said repeater, configured to receive said encoded data at a first data rate and further comprising:
a buffer in said data sink, different from said first buffer, for receiving said encoded data from said physical media, and outputting said encoded data at said first data rate to said repeater.

13. Apparatus, as claimed in claim 1, wherein said data sink is a hub of a star-topology network and said data source is a node of said star-topology network.

14. Apparatus for conveying data from a data source, over physical media, to a data sink, said data source including a media access controller which outputs first data in a packet form, the apparatus comprising:
a first buffer, coupled to said media access controller for receiving said first data in packet form and outputting at least said first data as a first plurality of groups of bits of said first data;
a first encoder for receiving and encoding at least said first data and outputting encoded data;
a clock-responsive transmitter coupled to said first encoder for receiving said encoded data and coupled to said physical media for transmitting said encoded data onto said physical media,
a reference clock, coupled to said transmitter, for establishing the beginning times of a plurality of contiguous time frames, each time frame having a plurality of time slots,
wherein each of said first plurality of groups of bits is transmitted by said transmitter during a first set of predetermined ones of said time slots, at least some of said first set of predetermined ones of said time slots being non-contiguous;
wherein said first encoder outputs said encoded data in a first encoded form according to a 4/5 encoding scheme wherein 4 bits of data are encoded into a 5-bit group;
wherein said data sink includes a repeater for said first data, configured to receive said first data in a second encoded form and further comprising:
a second encoder, different from said first encoder, in said data sink for encoding said first data in said second encoded form.

15. Apparatus, as claimed in claim 14, wherein said second encoded form is differential manchester encoding.

16. Apparatus for conveying data from a data source, over physical media, to a data sink, said data source including a media access controller which outputs first data in a packet form, the apparatus comprising:
a first buffer, coupled to said media access controller for receiving said first data in packet form and outputting at least said first data as a first plurality of groups of bits of said first data;
a first encoder for receiving and encoding at least said first data and outputting encoded data;
a clock-responsive transmitter coupled to said first encoder for receiving said encoded data and coupled to said physical media for transmitting said encoded data onto said physical media,
a reference clock, coupled to said transmitter, for establishing the beginning times of a plurality of contiguous time frames, each time frame having a plurality of time slots,
wherein each of said first plurality of groups of bits is transmitted by said transmitter during a first set of predetermined ones of said time slots, at least some of said first set of predetermined ones of said time slots being non-contiguous;
wherein said media access controller which outputs said first data in a packet form outputs a first indication of the beginning of a packet, outputs a first number of data bits after said output of said first indication and outputs an indication of the end of a packet, after said output of said first number of data bits and further comprising:
means for determining whether said first number of data bits is divisible evenly by a predetermined integer and for outputting a frame alignment signal if said first number of data bits is not divisible evenly by said predetermined integer.

17. Apparatus, as claimed in claim 16, wherein said predetermined integer is 4.

18. Apparatus, as claimed in claim 16, wherein said frame alignment signal is transmitted during one of said first set of said predetermined ones of said time slots.

19. Apparatus for conveying data from a data source, over physical media, to a data sink, said data source including a media access controller which outputs first data in a packet form, the apparatus comprising:

a first buffer, coupled to said media access controller for receiving said first data in packet form and outputting at least said first data as a first plurality of groups of bits of said first data;

a first encoder for receiving and encoding at least said first data and outputting encoded data;

a clock-responsive transmitter coupled to said first encoder for receiving said encoded data and coupled to said physical media for transmitting said encoded data on said physical media, a reference clock, coupled to said transmitter, for establishing the beginning times of a plurality of contiguous time frames, each time frame having a plurality of time slots, wherein each of said first plurality of groups of bits is transmitted by said transmitter during a first set of predetermined ones of said time slots, at least some of said first set of predetermined ones of said time slots of being non-contiguous;

wherein said media access controller outputs a preamble comprising at least one preamble symbol prior to outputting at least said first data and, and wherein said first buffer requires at least a first latency period between initial receipt of said first data and beginning output of said first data; and said first buffer including circuitry for distinguishing said preamble symbol from said first data and for outputting said preamble symbol a second period after receipt of said preamble symbol, said second period being less than said first latency period.

20. Apparatus for conveying data from a data source, over physical media, to a data sink, said data source including a media access controller which outputs first data in a packet form, the apparatus comprising:

a first buffer, coupled to said media access controller for receiving said first data in packet form and outputting at least said first data as a first plurality of groups of bits of said first data;

a first encoder for receiving and encoding at least said first data and outputting encoded data;

a clock-responsive transmitter coupled to said first encoder for receiving said encoded data and coupled to said physical media for transmitting said encoded data onto said physical media, a reference clock, coupled to said transmitter, for establishing the beginning times of a plurality of contiguous time frames, each time frame having a plurality of time slots, wherein each of said first plurality of groups of bits is transmitted by said transmitter during a first set of predetermined ones of said time slots, at least some of said first set of predetermined ones of said time slots being non-contiguous;

wherein said media access controller outputs a preamble comprising at least one preamble symbol prior to outputting at least said first data and, and wherein said first buffer requires at least a first length of data to be input before beginning output of said data; and said first buffer including circuitry for extending said preamble by repeating the output of said preamble symbol at least until said first length of said first data has been input into said first buffer.

21. Apparatus for conveying data from a data source, over physical media, to a data sink, said data source including a media access controller which outputs first data in a packet form, the apparatus comprising:

a first buffer, coupled to said media access controller for receiving said first data in packet form and outputting at least said first data as a first plurality of groups of bits of said first data;

a first encoder for receiving and encoding at least said first data and outputting encoded data;

a clock-responsive transmitter coupled to said first encoder for receiving said encoded data and coupled to said physical media for transmitting said encoded data onto said physical media, a reference clock, coupled to said transmitter, for establishing the beginning times of a plurality of contiguous time frames, each time frame having a plurality of time slots, wherein each of said first plurality of groups of bits is transmitted by said transmitter during a first set of predetermined ones of said time slots, at least some of said first set of predetermined ones of said time slots being non-contiguous;

wherein said media access controller does not output a preamble prior to outputting said first data; and said first buffer includes circuitry for generating and outputting at least one preamble symbol prior to outputting said first data.

22. A method for transmitting both data from a packet source and data from an isochronous source onto a physical medium comprising:

transmitting signals onto said physical medium during a first time frame, said frame comprising a predetermined number of time slots, according to a first frame structure defining first and second pluralities of time slots wherein said first plurality of said time slots is used for transmission of a first plurality of symbols in response to said isochronous data source, each of said first plurality of symbols comprising a plurality of bit-groups, each for conveying a first predetermined number of data bits, and said second plurality of said time slots being used for transmission of a second plurality of symbols in response to said packet source, said second plurality of symbols comprising at least a first bit-group for transmission in response to a period of non-output of a packet from said packet source and a plurality of bit-groups, different from said first bit-group, each for conveying a first predetermined number of data bits in response to output of a packet from said packet source, repeating said step of transmitting, during subsequent time frames, at regular time intervals, according to said first frame structure.

23. Apparatus for transmitting both data from a packet source and data from an isochronous source onto a physical medium comprising:

means for transmitting signals onto said physical medium during a first time frame, said frame comprising a predetermined number of time slots, according to a first frame structure defining first and second pluralities of time slots wherein said first plurality of said time slots is used for transmission of a first plurality of symbols in response to said isochronous data source, each of said first plurality of symbols comprising a plurality of bit-groups, each for conveying a first predetermined number of data bits, and said second plurality of said time slots being used for transmission of a second plurality of symbols in response to said packet source, said second plurality of symbols comprising at least a first bit-group for transmission in response to a period of non-output of a packet from said packet source and a plurality of bit-groups, different from said first bit-group, each for conveying a first predetermined number of data bits in response to output of a packet from said packet source, means for repeating the transmitting of signals by said means for transmitting, during subsequent time frames, at regular time intervals, according to said first frame structure.

* * * * *